Oct. 16, 1934.   J. C. THOM   1,976,971
LABEL ASSEMBLY MECHANISM AND METHOD
Filed Feb. 10, 1933   7 Sheets-Sheet 1
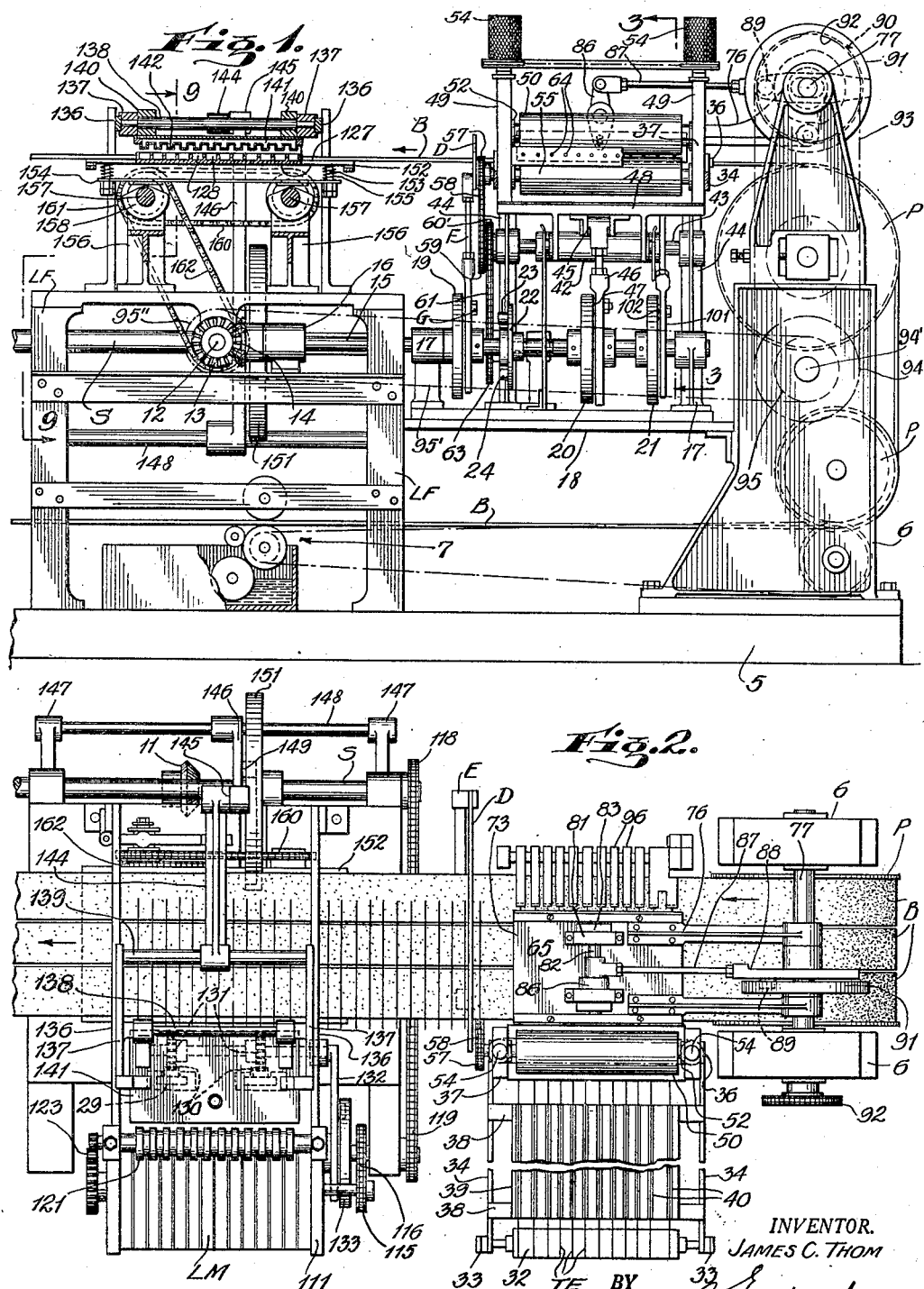
INVENTOR.
JAMES C. THOM
BY
ATTORNEY

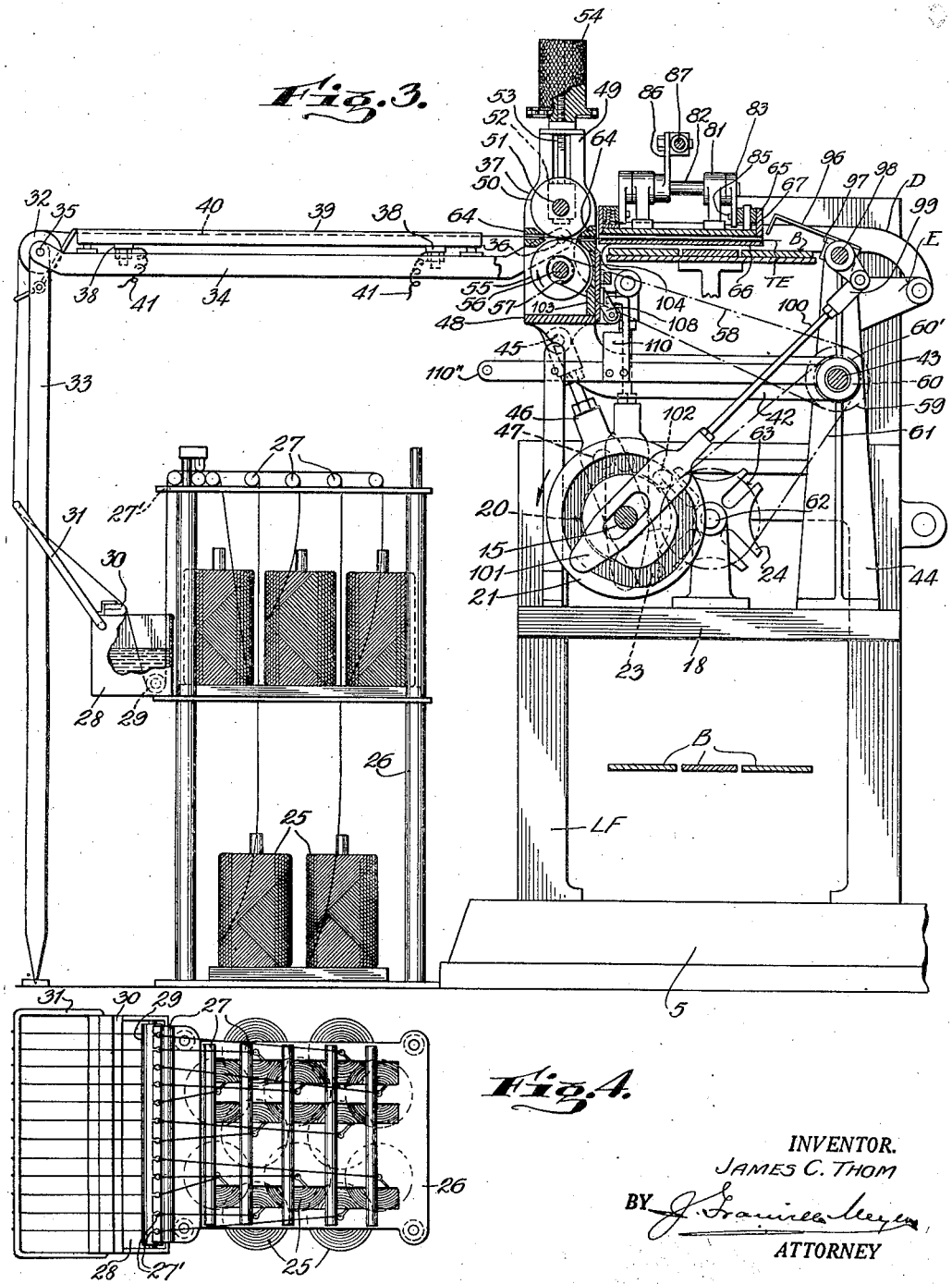

Oct. 16, 1934.   J. C. THOM   1,976,971
LABEL ASSEMBLY MECHANISM AND METHOD
Filed Feb. 10, 1933   7 Sheets-Sheet 3
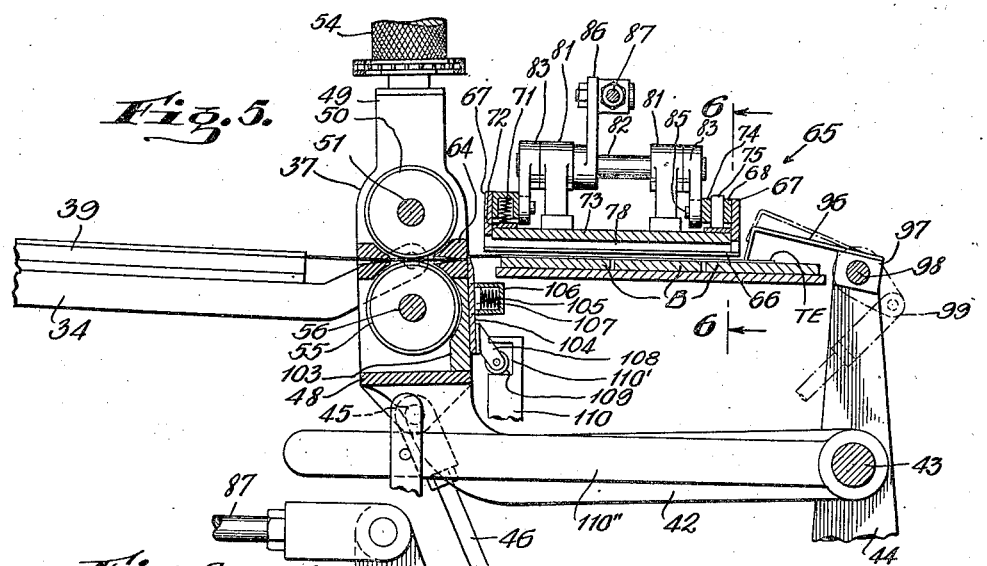
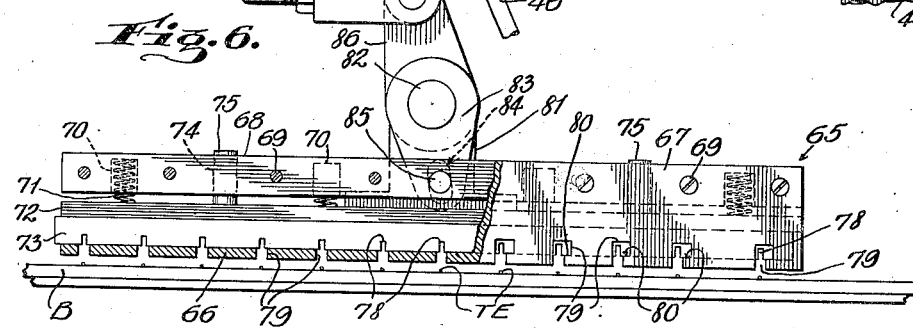
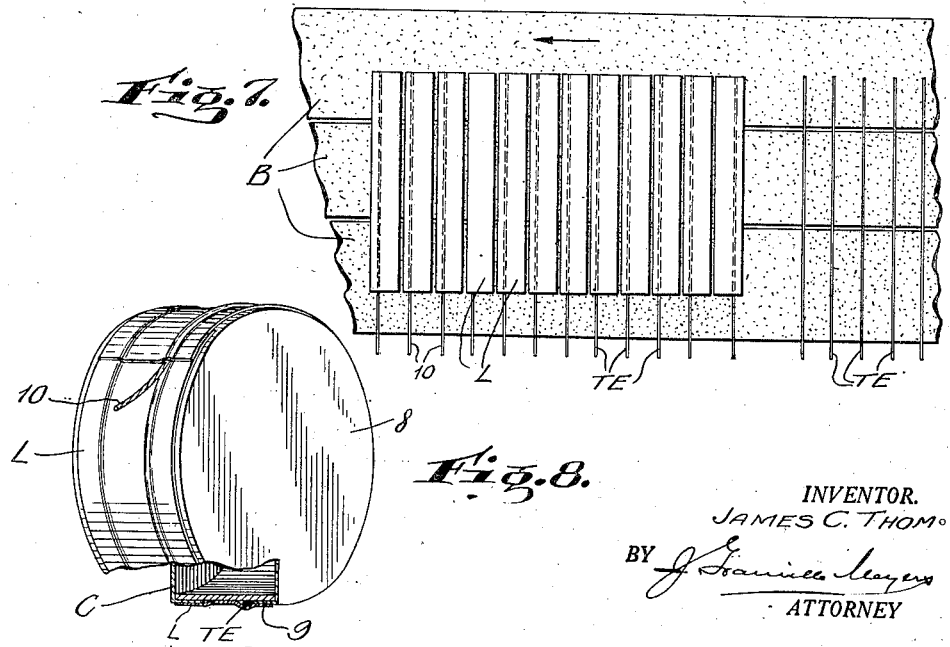
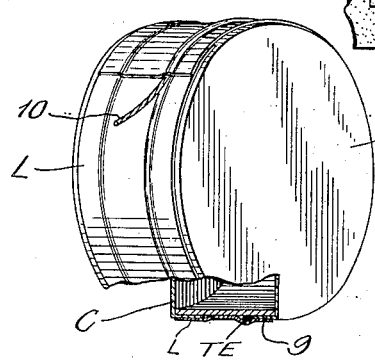
INVENTOR.
JAMES C. THOM
BY
ATTORNEY Oct. 16, 1934.  J. C. THOM  1,976,971
LABEL ASSEMBLY MECHANISM AND METHOD
Filed Feb. 10, 1933  7 Sheets-Sheet 4
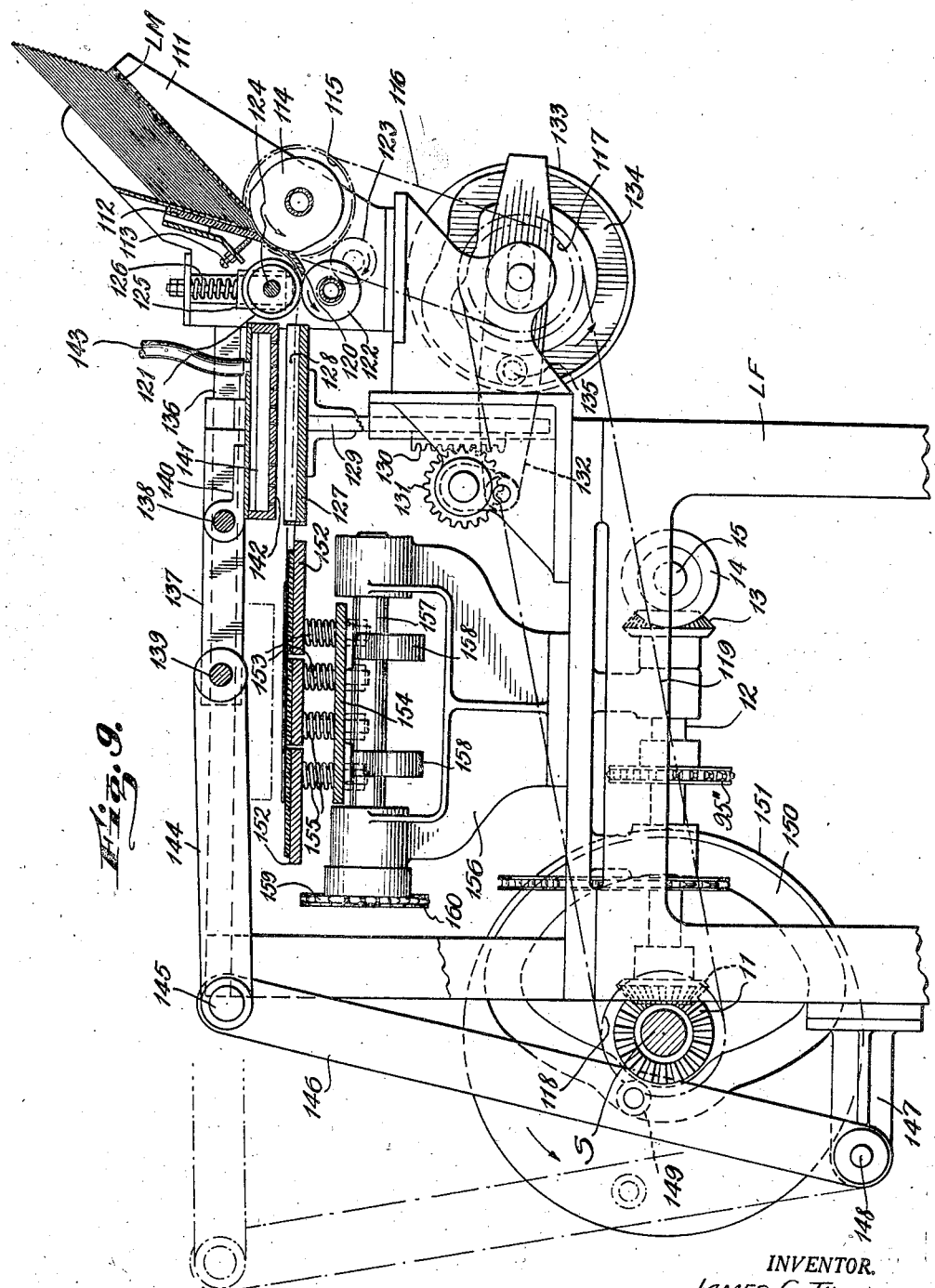
INVENTOR.
JAMES C. THOM
BY
ATTORNEY Oct. 16, 1934.  J. C. THOM  1,976,971
LABEL ASSEMBLY MECHANISM AND METHOD
Filed Feb. 10, 1933  7 Sheets-Sheet 5
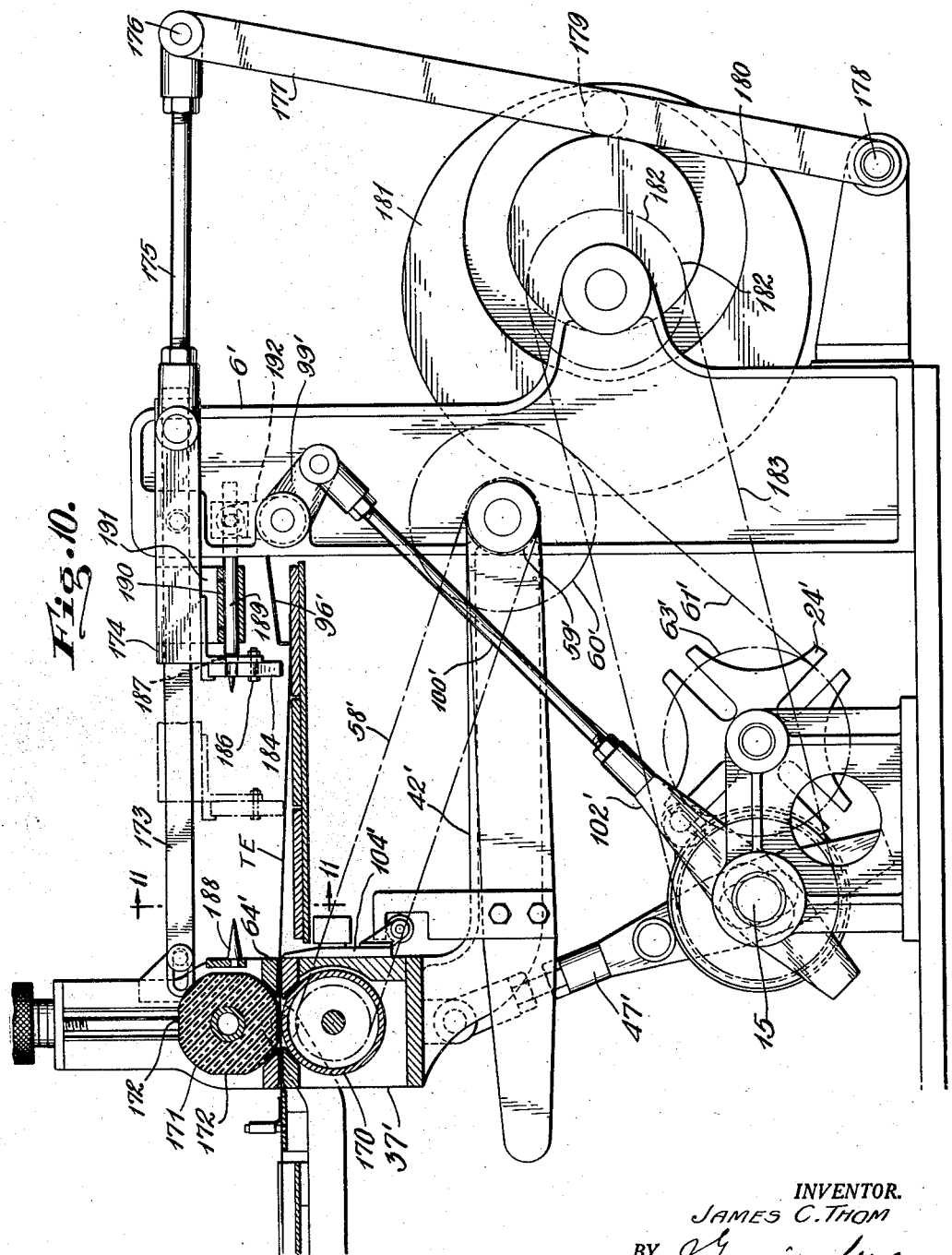
INVENTOR.
JAMES C. THOM
BY
ATTORNEY.

Oct. 16, 1934.   J. C. THOM   1,976,971
LABEL ASSEMBLY MECHANISM AND METHOD
Filed Feb. 10, 1933   7 Sheets-Sheet 6
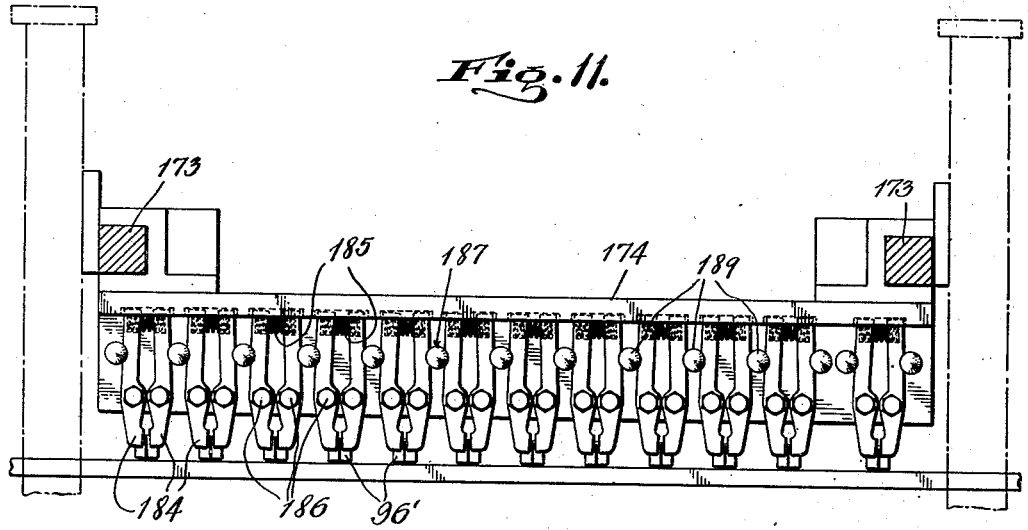
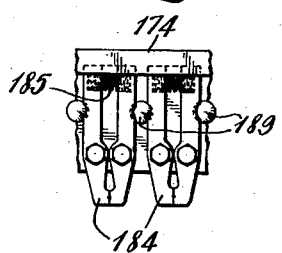
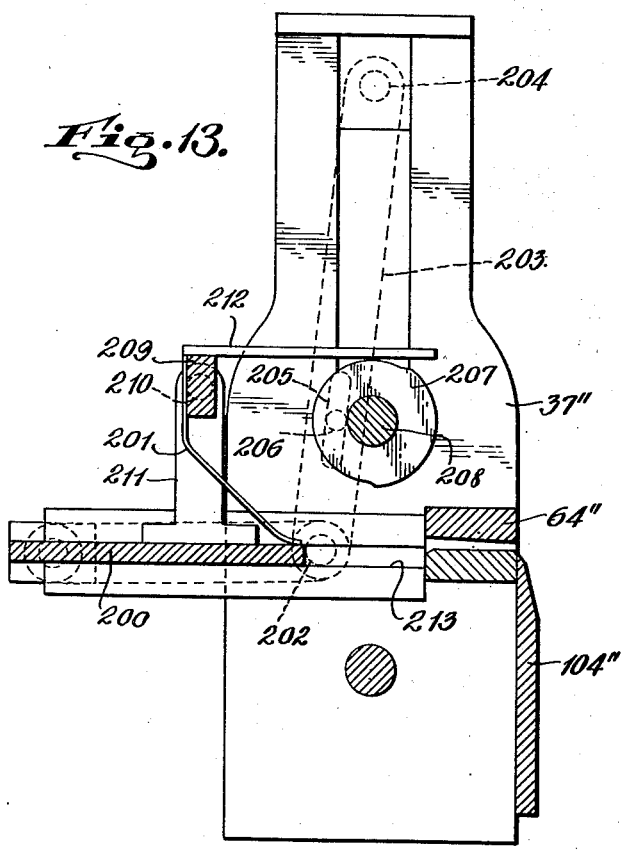
INVENTOR.
JAMES C. THOM
BY
ATTORNEY.

Oct. 16, 1934.  J. C. THOM  1,976,971
LABEL ASSEMBLY MECHANISM AND METHOD
Filed Feb. 10, 1933  7 Sheets-Sheet 7
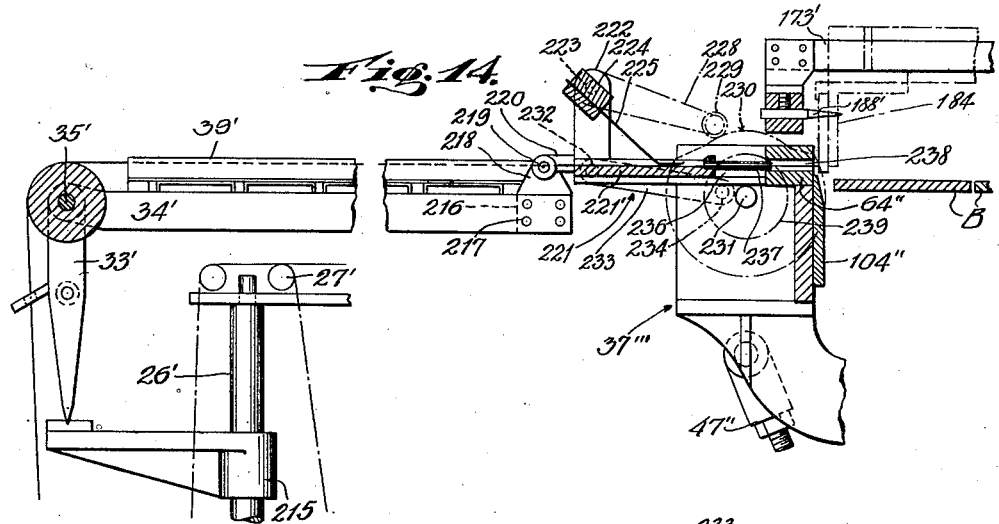
Fig. 14.
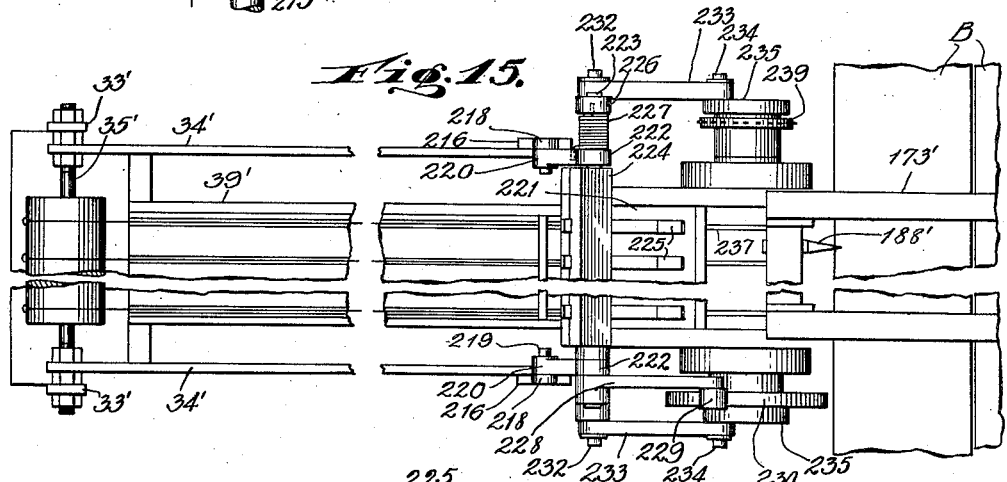
Fig. 15.
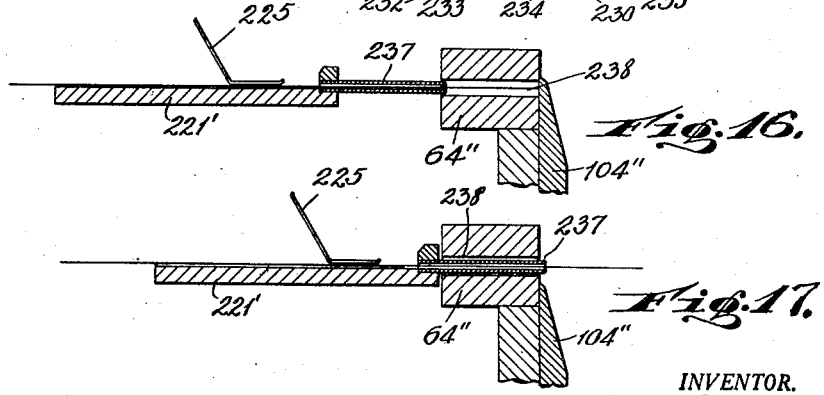
Fig. 16.
Fig. 17.
INVENTOR.
JAMES C. THOM
BY
ATTORNEY.

Patented Oct. 16, 1934

1,976,971

UNITED STATES PATENT OFFICE 1,976,971

LABEL ASSEMBLY MECHANISM AND METHOD

James C. Thom, Chicago, Ill., assignor to United States Tobacco Company, New York, N. Y., a corporation of New Jersey Application February 10, 1933, Serial No. 656,154

21 Claims. (Cl. 216—52)

My present invention relates to methods and apparatus for preparing and applying tearing elements to labels and the like, whereby the assembled elements and labels can be applied as a unit to containers or articles in predetermined manner to facilitate opening the containers.

A great many commodities such as tobacco products, foods, and chemicals are packed and sold in containers comprising a body and a slip cover having a flange engaging over the open end of the body with a sheet of paper, such as a label or wrapper, applied around the walls of the body and flange of the cover and extending across the free end of the flange. There is considerable difficulty in opening such containers as the sheet must be severed at the end of the flange. A great many persons use their finger nails to sever the sheet and others use knives or sharp instruments which are dulled or rip through the container body, according to its character, and sometimes slip and injure the hand of the person attempting to open the container.

The principal general object of my invention is to provide labelled packages or containers of the above type with a tearing element such as a cord, or other flexible strand, located adjacent the end of the cover flange around the body of the container and under the label with an end projecting from the label or wrapper so that it may be grasped and pulled to cause the element to sever the label or wrapper quickly and evenly around the end of the cover flange, whereby the cover may be freed from the label or wrapper and easily removed.

The foregoing object may be accomplished in connection with various types of receptacles and by various forms of apparatus adapted for use with various types of label or wrapper applying mechanism, such as that disclosed in my copending application, filed Nov. 14, 1932, Ser. No. 692,628, now matured into Patent No. 1,927,473, issued September 19, 1933 and in Patent No. 1,433,909, issued October 31, 1922, the apparatus illustrated and described in my present application, and numerous other types of labelling, sealing or wrapping apparatus as will become hereinafter apparent.

One feature of the invention is the treatment of normal cord or thread in such a manner as to stiffen the same, whereby it may be so positioned and cut continuously in lengths which are assembled or associated with the labels or wrappers along a predetermined straight line on the wrappers or labels which line will preferably coincide with a line around the body of the container at the end of the cover flange when the label and cord are applied thereto as a unit. In accordance with my method and apparatus the thread can be severed between the labelling supporting surface and the means for feeding the thread so that there will be a continuous feeding and cutting of the same thread at predetermined intervals.

Where the invention is practiced in conjunction with apparatus of the type disclosed in my copending application, Ser. No. 642,628 or Patent No. 1,433,909, or the apparatus shown in this application the threads will be placed across belts and arranged in groups corresponding to the groups of labels which are applied to the belts, but it is not essential in the practice of the invention to apply the tearing elements to belts, nor to apply them before positioning of the labels on the wrapping support.

Stated generally, as to method, my present invention comprises the assembling of a label, wrapper, or the like, with a strand of flexible material on or in contact with one face of the label or the like with one end of the strand projecting beyond an edge of the label or the like whereby they may be applied as a unit or simultaneously to a container or article with the label covering the tearing element whereby the latter may be manipulated to sever the wrapper. The means for applying the label and element to the container or article may be any of numerous existing types, and not necessarily that disclosed or mentioned herein for specific illustration only.

All of the objects and advantages of the invention and means for practicing it will become more apparent and will be pointed out during the course of the following detailed description of the accompanying drawings, in which Fig. 1 is a side elevation partly in section of apparatus for applying strands and labels to conveyors of the type disclosed in my said co-pending application;

Fig. 2 is a top plan view of the apparatus shown in Fig. 1;

Fig. 3 is a view on the line 3—3 of Fig. 1;

Fig. 4 is a top plan view of the strand or cord treating mechanism;

Fig. 5 is an enlarged side view partly in section of the mechanism for applying the strands to the belts;

Fig. 6 is an end view of apparatus for guiding the strands across the belts;

Fig. 7 is a fragmentary top plan view of a fragment of the belts showing part of a group of strands applied to the support or conveyors and a complete group of strands and labels applied to the support or conveyors;

Fig. 8 is a perspective view of a container with the tearing element applied thereto, a portion of the container being broken away and shown in section;

Fig. 9 is a view on the line 9—9 of Fig. 1;

Fig. 10 is a view similar to Fig. 5 showing another form of strand applying mechanism;

Fig. 11 is a view on the line 11—11 of Fig. 10;

Fig. 12 is a fragmentary front view of the grippers and carrier shown in Fig. 11 in another position;

Fig. 13 is a side elevation partly in section of another form of mechanism for advancing the tearing elements to grippers such as shown in Figs. 10 and 11;

Fig. 14 is a view similar to Fig. 1, with parts broken away showing another form of thread advancing mechanism;

Fig. 15 is a top plan view of the parts shown in Fig. 14; and

Figs. 16 and 17 are enlarged detailed views of the thread clamping and guiding means of Fig. 14 in retracted and advanced positions.

Referring to Figs. 1–3 of the drawings, the numeral 5 designates a base on which are mounted uprights 6 supporting pulleys P over which run the belts B in upper and lower flights. The arrangement of the belts and pulleys and mechanism for driving the same will be found in my said co-pending application, Ser. No. 642,628 and Patent No. 1,433,909, which disclose in detail the apparatus for applying an adhesive to the under face of the lower flight of belts and designated in this application generally by the numeral 7, whereby the said surface of the belts is presented as the top of the upper flight to receive labels. In my said co-pending application and the said patent, it is disclosed that the central belt disappears at a point intermediate the label applying mechanism and the wrapping mechanism, so that labels are carried to the wrapping mechanism stretched across the two outer belts. My present invention may be adapted to use in connection with such mechanism, by providing means for applying a group of tearing elements in predetermined positions across the belts prior to the application of the labels, the predetermined positions being such that the labels will be placed on the belts one over each tearing element along a line which will correspond to the line around the end of the container lid. This is illustrated in Fig. 8, wherein the container C has a slip cover 8 with the flange 9 engaging the side wall of the container. The label L is pasted around the side wall of the container and over the lower end of the flange 9. The tearing element TE is disposed around the wall of the container at the end of the flange 9 beneath the label L, and has one end 10 projecting freely out beyond the end of the label so that it may be grasped and pulled to rip the label at the end of the flange 9, so that the lid 8 may be readily removed. The invention may be practiced in connection with various shapes and sizes and types of containers and articles, and that shown in Fig. 8 is merely illustrative.

Reverting to Figs. 1–3, the letter S designates a shaft driven by mechanism not shown, to operate the tearing cord applying and label applying mechanism. The shaft S drives gears 11, which in turn drive shaft 12 connected to a gear 13 which meshes with a gear 14 on the shaft 15 journaled through a trunnion 16 on frame LF, trunnions 17 on frame 18 supported by frame LF and uprights 6. The shaft 15 is keyed to cam wheels 19, 20 and 21 and disc 22, which carries lug 23 to operate the Geneva gear 24, which, in the embodiment being described, operates the means for feeding the tearing elements across the belts.

I would have it understood that the tearing elements may be in the nature of any flexible strands, such as thread, cord, or even thin wire, but where thread or cord is used it is necessary to impart thereto sufficient stiffness to enable it to be pushed through guides for positioning on the belts or wrapping support. Although it may be possible to acquire the threads or cords already treated or stiffened, I have found that the stiffening of the cord or threads may be accomplished simultaneously with the application of the threads to the belts. Apparatus for accomplishing this is disclosed in Figs. 3 and 4, wherein a number of bobbins 25 are supported by a frame 26 at the top of which are a plurality of rollers or rods 27, over which the threads from the bobbins run. On the frame 26 I have shown a container 28 for a stiffening fluid. Rollers 29 are submerged in the fluid and the threads come from the rod 27 down through eyes 27′ and around the rollers 29 through the fluid and then up and across a wiper 30 which removes excess fluid from the threads. The threads then pass over a tension guide 31 and roller 32 at the top of uprights 33. Side pieces 34 are connected at 35 to the uprights 33 and at their other ends at 36 to a frame 37. The side pieces 34 support cross pieces 38 on which is mounted a plate 39 having alined channels or openings 40 extending thereacross, Fig. 2, and through which the threads run. The plate 39 has associated therewith an electric resistance unit which may be connected to electric wires 41, whereby the plate is heated so that the threads which are saturated with the stiffening fluid are dried during their passage through the channels or openings 40.

The frame 37 is supported by arms 42 which are pivotally connected to a shaft 43 mounted between uprights 44 supported by the frame 18. The frame 37 is also pivotally connected at 45 to a crank 46 which has a projection 47 disposed in the cam slot of the disc 20, so that as the disc is rotated by the shaft 15, the frame 37 will be moved up and down at predetermined intervals. The frame 37 includes a bottom plate 48 extending between uprights 49, and a roller 50 is journaled on a shaft 51 in the upper part of the frame 37, the shaft 51 being supported by a block 52 which is adjustable by the screw 53 operable by knobs 54 on top of the frame 37 coupled together by a chain and sprockets to obtain uniform adjustment on both sides. A second roller 55 is keyed to a shaft 56 between the uprights 49, the shaft extending through one of the uprights and having a sprocket wheel 57 keyed thereto (see Figs. 1 and 3). A sprocket chain 58 is trained around the wheel 57 and also around a sprocket wheel 59 driven by a sleeve shaft 60 keyed to sprocket wheel 60′ over which is trained a chain 61. The Geneva gear 24 is keyed to a shaft 62 which carries a sprocket wheel 63 driven by the Geneva gear. The projection 23 on the disc 22 enters between the teeth on the Geneva gear as the shaft 15 rotates and imparts a quarter turn to the Geneva gear, which is sufficient to rotate the sprocket 57 several revolutions and hence rotate the rollers 50 and 55 between which the stiffened thread is disposed. The threads extend through guides 64 at the front and back of the frame. The adjustment of the apparatus is initially such that the guides 64 are normally in alinement with the channels or openings in the plate 39, and also in alinement with channels in the thread guide plate designated generally by the numeral 65 in Figs. 2 and 3.

The member 65 is shown best in Figs. 5 and 6, wherein the numeral 66 designates a bottom plate of channel formation having upstanding sides 67. Bars 68 are secured to the sides 67 by screws 69, the bars having at spaced intervals recesses 70 receiving coil springs 71 which bear against wear strips 72 disposed on the top of a plate 73 between the sides 67 and below the bars 68. The bars 68 also have at other intervals, openings 74 to receive dowel pins 75. The plate 73 is fixedly secured to arms 76, Fig. 2, which are connected to a shaft 77 journaled between the tops of the uprights 6 and which hold the member 65 above the belts B. The plate 73 is provided with channels 78 in its bottom face which are in alinement with the thread openings in the guides 64, and the plate 66 is provided with bayonet slots 79. In normal position of the plates 73 and 66, the shoulders 80 of the bayonet slots 79 are disposed under the channels 78 to close the same so that the stiffened threads pulled through the plate 39 by the rollers 50 and 55 and pushed through the guide 64 at the right of the frame 37 in Fig. 3 will enter the channels 78 and be pushed therethrough with their ends projecting from the opposite side of the member 65 as shown in Fig. 3. The Geneva gear 24 imparts to the rollers 50, 55, sufficient movement to position the threads through the member 65 a predetermined distance at each operation.

Referring again to Figs. 3, 5 and 6, the plate 73 fixedly supports trunnions 81, and the shaft 82 is journaled through the trunnions 81, the ends of the shaft 82 being keyed to rockers 83 having openings 84 receiving pins or lugs 85 extending from the rods or bars 68. There is also keyed to the shaft 82 a crank 86 operated by a link 87 connected (see Fig. 2) to a crank 88 having a projection 89 in a cam slot 90 (see Fig. 1) of the disc 91 which is rotated by the shaft 77. The shaft 77 is driven by the sprocket wheel 92 over which is trained the chain 93 on shaft 94' to which is keyed a sprocket wheel 95 driven by chain 95' which is trained over a sprocket wheel 95'' on shaft 12.

At the side of the member 65 opposite to the frame 37, are a plurality of gripping fingers 96 on a strip 97 pivoted on a shaft 98, as shown best in Figs. 3 and 5. Bell crank lever 99 is connected to a link 100 which is also connected to a crank 101 having a projection 102 located in the cam slot in the wheel 21.

The operation of the parts thus far described is synchronized so that with the members 37, 65, 96, and their actuating mechanism in the positions shown in Fig. 3; and with the channel 78 closed by the shoulders 80, the parts 37, 65, and 96 will remain inactive while the Geneva gear is given a quarter turn to rotate the rollers 50 and 55 and push the threads through the channels 78 and under the gripping fingers 96 to the position shown in Fig. 3. When the threads have been thus positioned, the cam wheel 11 actuates the crank 101 and link 100 to rock the bell crank 99 and swing the gripping fingers 96 down to bring the ends of the cords into contact with the pasted belts E, the fingers gripping the cords tightly. The cam 91 then actuates the crank 88 and link 87 to move the rockers 83 and move the plate 66 relative to the plate 73 to the position shown in Fig. 6, that is, to move the shoulders 80 from under the channels 78, so that the cords may engage the belts beneath the member 65. The next movement is imparted to the frame 37 by the crank 46 which moves the frame and rollers down with the cords still gripped between the rollers, whereby the cords are made taut across and against the pasted belts in the relative positions illustrated in Figs. 2 and 6, that is, immediately beneath the channels 78. It is then necessary to sever the cords so that the belts may move onward and carry the group of cords applied thereto to the label applying mechanism. To the accomplishment of this, I provide the arrangement of severing device shown in Figs. 3 and 5.

Referring to Figs. 3 and 5, it will be seen that the frame 37 includes a plate 103 above the base 48 and on the side of the frame next to the belts. A knife blade 104 is slidably held against the plate 103 by studs 105 surrounded by caps 106 within which is compressed a coil spring 107 pushing the knife blade against the member 103. The lower edge of the knife blade is connected to a bracket 108 carrying a roller 109 located within a notch 110' in the upright 110 fixedly secured to a support 110''. The normal position of the knife blade and frame 37 is as shown in Fig. 3 with the roller contacting the top of the notch 110'. Now, when the frame 37 moves down to stretch the cords taut on the belts the knife blade moves therewith until the roller 109 engages the bottom of the notch 110', after which the frame 37 continues to move down but the knife blade does not, so that the cords are severed at the end of the guide 64 as shown in Fig. 5. When the frame 37 moves up again, the knife blade 104 moves therewith until the roller 109 contacts the top of the notch 110' which prevents further movement of the knife while permitting continued movement of the frame 37, whereby the parts are re-established in the position of Fig. 3, the belts then moving on to carry the group of strands to the label applying mechanism, the Geneva gear 24 again operating to feed another group of strings through the guides in the plate 65, after which the operation of the parts is repeated as above described.

While the label applying mechanism may be the same as that disclosed in my said co-pending application, Ser. No. 642,628, I have here illustrated a different type in Figs. 1, 2, and 9 supported by the frame LF. Inasmuch as I have shown a gang strand applying mechanism, I also show a gang label applying mechanism, but it is not essential to practice the invention in connection with gang mechanisms.

Referring to Fig. 9, the numeral 111 designates a support for a label magazine LM which may have a plurality of compartments equal to the number of labels to be applied over the tearing cords when the invention is used with a gang labelling machine. At the forward lower end of the label magazine, there is a plate 112 which may be adjusted by the screw 113 relative to a feed roller 114 which is rotated beneath the open end of the label magazine in contact with the lowermost label by a sprocket wheel 115 and chain 116 and sprocket wheel 117, which may be driven by a sprocket wheel 118 and chain 119, the wheel 118 being mounted on driving shaft S. In advance of the roller 114, there is a guide plate 120 in alinement with gripper rollers 121 and 122, the latter being preferably driven by gear 123, which in turn may be driven by the mechanism for rotating the roller 114. The shaft 124 on which the roller 121 is mounted may be carried by an adjustable bracket 125 normally urged toward the roller 120 by a spring 126 so that the rollers will contact to receive and project therebetween the labels fed by the roller 114. A plate 127 having a plurality of channels 128, Figs. 1 and 9, is supported on vertical bars 129 to which are connected racks 130 meshing with pinions 131 which are rotated in alternating directions by crank 132 operated by cam wheel 133 having a slot 134 receiving a projection 135 on the crank 132. Above the belts and plate 127 there are tracks 136 slidably supporting carriers 137 between which are mounted shafts 138 and 139, the former receiving a plate 140 which is rigidly secured to a sucker head 141 having a plurality of label receiving faces 142 above the channels 128. The sucker head may be connected by a flexible tube 143, to suction apparatus not shown. The shaft 139 is connected to a link 144 which is connected at 145 to a lever 146 pivoted at its other end to a bracket 147 at 148. The lever 146 has a projection or lug 149 in the cam slot 150 of the cam wheel 151, which may be operated by the shaft S. The cam slot 150 is designed to reciprocate the lever 146 so that the link 144 will impart reciprocating motion to the sucker head along the tracks between the plate 127 and the belts from the full line position to the dotted line position of Fig. 9.

The belts rest on plates 152 which receive bolts 153 mounted through a plate 154 with coil springs 155 surrounding the bolts, whereby the plates 152 are yieldably supported above the plate 154. Uprights 156 support shafts 157 to which are keyed cams 158 to engage the plate 154. The shafts 157 are keyed to sprocket wheels 159 over which is trained a chain 160, Fig. 1, so that both shafts will be operated simultaneously. One of the shafts is driven by a sprocket wheel 161 and chain 162 leading to a sprocket wheel operated by the shaft 12.

When the belts bring a group of tearing elements in front of the plate 127 with each strand at a predetermined point relative to the channels 128, the feed roll 114, pushes labels from the magazines between the gripper rolls 121, 122, which push the labels into the channels 128. The carrier 129 is then raised by the pinion and rack 131, 130, until the labels contact the ribs on the sucker head, at which time the suction is applied to hold the labels on the ribs. The sucker head is then moved to the dotted line position of Fig. 9, the cams 158 raise the plates 154, 153, to bring the belts and strings thereon into contact with the labels, at which time the suction goes off, so that the labels and tearing elements are associated in predetermined relative positions for movement to the wrapping apparatus.

To prevent the belts from being raised beneath the string applying mechanism when they are raised toward the label applying mechanism by the spring compression plates 152 and cams 158, I mount a blade D across the belts intermediate the tearing element and label applying mechanisms, as shown in Figs. 1–3. One end of the blade is pivotally connected to a fixed bracket E, and the other end is connected to the upper end of a link F, the lower end of which carries a lug or pin G disposed in a cam slot in the disc 19. Normally the blade is spaced from the belts but at the time when the belts are being raised beneath the label applying mechanism, the link F is brought down by the cam disc 19 and lug G so that the blade is oscillated on its pivot and engages the belts holding them level beneath the tearing element applying mechanism. When the belts again move down beneath the label applying mechanism the link F is raised lifting the blade D clear of the belts so that they may carry another group of tearing elements to the label applying mechanism for repetition of the operation above described.

The relative positions of the labels and tearing elements are shown clearly in Fig. 7 after the sucker head has released the labels, there being one tearing element beneath each of the labels adjacent one edge of the label with the tearing element extending outwardly from one end of the label. It will be noted that one of the tearing elements, the one beneath the end label to the right in Fig. 7, is disposed along a different edge of the label than the others are, with respect to their labels. The reason for this is that in packaging certain commodities, there are fibre or cardboard boxes with metallic covers, and I have reversed one end package to utilize a similar surface of the end containers to form the end of the finished package. It is not essential to the practice of the invention of course to so arrange the labels and tearing elements, an essential point being to so associate the tearing element and label that the tearing element will be disposed around a container immediately adjacent the flange of the cover as shown in Fig. 8. Indeed, it is not essential to the practice of the invention to utilize a gang labelling machine nor the particular type of wrapping machine disclosed, as it is obviously possible to position the labels on a wrapping support with gummed faces up and apply the tearing element to the labels and then wrap the assembled labels and strands about a container.

In Figs. 10–12, I have shown another embodiment of the invention in the mechanism for feeding the strings across the belts. Referring to Fig. 10, the numeral 37' designates generally a frame substantially identical with the frame 37, previously described, and supported and operated by the same mechanism described in connection with Figs. 3 and 5 including crank 47' and arms 42'. The cutting knife 104' is supported and operated exactly the same as the knife 104. The gripper fingers 96' are also the same as the gripper fingers 96 and operated by the same mechanism including the crank 102'. While the feed rollers within the frame 37' are also rotated by a Geneva gear 24' and sprockets 59' and chains 58' and 61', there is a difference in the construction of the rollers and the amount of movement for feeding the threads. For instance, the lower roller 170 is preferably of steel and round, whereas the upper roller 171 is preferably of rubber and has four flattened faces 172. Each time the Geneva gear 24' operates, it imparts only a quarter of a revolution to the rollers 170, 171, whereby the threads are projected through the guide 64' only a relatively short distance. The construction shown in Fig. 10 provides tracks 173 connected at one end to the frame 37' and at their other ends to the uprights 6'. The tracks extend across the belts and a gripper frame carrier 174 is slidably mounted on the tracks. The gripper frame carrier 174 is connected to a link 175 which is also connected at 176 to a lever 177 pivoted to the frame at 178 and having a projection or lug 179 in the cam slot 180 of the cam wheel 181, which may be rotated by a sprocket wheel 182 and chain 183 leading to a sprocket wheel on the shaft 15. The gripper frame carrier 174 supports a plurality of gripping jaws 184, shown best in Figs. 11 and 12. A coil spring 185 is mounted between each pair of gripping jaws, which are pivoted at 186 to the frame 174. The springs normally hold the lower ends of the gripping jaws together. Adjacent each of the gripping jaws, there is an opening 187 in the plate 174. Above the guide 64' on the frame 37' there are fixedly mounted a plurality of taper pins 188 in alinement with the openings 187. Similar pins 189 are mounted through openings 190 in a plate 191 adjacent the other ends of the tracks. The tapered ends of the pins 189 are alined with pins 188, and their other ends are connected to an extension 192 on the gripping finger crank 99'.

The operation of the apparatus shown in Figs. 10–12 is as follows: When the rollers 170, 171, push the tearing elements through the guide 64' a relatively short distance, the frame 174 is pushed by the link 175 and lever 177 toward the frame 37' on the tracks 173. When the frame 174 reaches its limit of movement to the left of Fig. 10, the pins 188 enter the openings 187 between jaws 184 and force the jaws against the action of the springs 185 to open position shown in Fig. 11 with a thread between each pair of jaws. As the lever 177 and link 175 pull the frame 174 back on the tracks 173, the jaws 184 move from contact with the pin 188 and the springs return the jaws to closed position with each pair gripping a thread therebetween. Continued movement of the frame ultimately brings it to the full position of Fig. 10, at which time the crank 99' moves extension 192 to force the pins 189 through the openings 187 into engagement with the gripping jaws to open them and at the same time the gripping fingers 96' are forced down to hold the strings tightly against the belts. The frame 37' is then moved down and the knife 104' will sever the threads between the guide 64' and the belts. When the belts carry the strings to the label applying mechanism, the rollers 171, 170, will again feed the strings for gripping by the levers 184 and the above operation is repeated.

In Fig. 13, I have shown another type of mechanism for advancing the tearing elements, whereby I may dispense with the rollers for advancing the tearing elements to grippers, such as disclosed in Figs. 10–12. The frame 37'' has the thread guide opening 64'' similar to the guides 64 and 64', and through which the threads are pushed toward the belts by the plate 200 and fingers 201. The plate 200 is slidable in grooves 213 and is connected at 202 to a link 203 pivoted to the frame at 204. The link has a slot 205 receiving a pin 206 on the cam disc 207 on shaft 208, which may be rotated by the means employed for rotating roller 170 of Fig. 10. A carrier 209 is pivoted at 210 to uprights 211, and supports fingers 201 at spaced intervals above the threads. On top of the carrier is an arm 212 which is contacted by the cam and raised and lowered to oscillate the carrier bar 209 and hence raise and lower the fingers 201 relative to the plate 200. In operation the threads are fed under the fingers 201 and up to the face of the knife 104' through the guide 64'', at which time the plate 200 is in the back position. When the cam 207 rotates, the fingers 201 will be pressed down against the threads on the plate 200. The plate 200 is then moved forward or to the right of the position shown in Fig. 13 in the track 213, feeding the thread through the guide 64''. The threads are then released by the grip fingers 201, caught by grippers 184, and pulled across the belts. The plate 200 is returned to repeat the operation.

Still another embodiment of the invention operating generally similar to that of Fig. 13, is shown in Figs. 14–17, and wherein the numerals 26', and 27' designate fragments of the parts 26 and 27 of Fig. 3; that is, the uprights and thread guiding rods of the bobbin frame. Instead of extending the uprights 33' to the floor, as in the case of uprights 33 of Fig. 3, I may provide brackets 215 on the posts 26', to support the uprights, the ends of which have point engagement with and rest on the outer ends of brackets 215 or blocks thereon. The upper ends of uprights 33' are pivotally secured to shaft 35' as are also side bars 34', the same as parts 33, 34 and 35 of Fig. 3, and bars 34' support the thread drying or hot plate 39'. The other ends of the bars 34' have secured thereto plates 216 as by rivets 217. Plates 216 have upstanding portions 218 receiving pins 219, which extend also through bars 34' and supports 220. The other ends of supports 220 are connected with the thread feed frame 221 adjacent uprights 222 forming part of the frame, so that the said frame and hot plate frame are pivotally connected at 219.

A shaft 223 is journaled between the upper ends of uprights 222 and has secured thereto a bar 224, similar to bar 209 of Fig. 13, and to which are secured clamping fingers 225, similar to fingers 201 of Fig. 13 and serving the same purpose, namely, gripping the threads against plate 221' at predetermined times. A collar 226 is keyed to the shaft 223, and a coil spring 227 is mounted around the shaft with one end anchored in collar 226 and the other end anchored in upright 222. The tendency of the spring to unwind tends to turn the shaft so that the fingers 225 are normally held against the strings and plate 221'. To the other end of the shaft 223 is keyed an arm 228 which carries a roller 229 disposed on the periphery of a cam disc 230 on shaft 231 which is journaled through frame 37'''.

Shafts 232 are journaled at their inner ends in opposite sides of frame 221 beneath uprights 222, and are connected at their outer ends to crank arms 233, also connected at 234 to wheels 235 keyed to opposite ends of shaft 231. Plate 221' has guided movement in channels 236 in frame 37''', and has secured to its forward end tubes 237, alined with the channels in the hot plate and with openings 238 in the guide 64'' on frame 37''', and which guide is similar to the part 64 of Fig. 5. Knife 104'' operates across the guides 64'' and openings 238 in the same manner as described in connection with Fig. 5. The parts 173', grippers 184', and pins 188', are the same as those shown in Figs. 10 and 11, and are operated in the same manner by the mechanism previously described.

A sprocket wheel 239 is keyed to shaft 231 and is driven to rotate the shaft by a sprocket chain such as 58 of Fig. 3 or 58' of Fig. 10, the chain of course being also trained around a sprocket wheel 59 or 59' of Figs. 3 and 10.

The operation of the mechanism shown in Figs. 14–17 is as follows: With the parts in the position shown in Fig. 14 and with the threads extending across the hot plate, plate 221', one beneath each finger 225, and through tubes 237 and openings 238 up to the knife, one half rotation of the cranks 235 will, through arms 233, move the frame 221 toward the guide 64'' and place the tubes 237 in the position of Fig. 17, that is, within openings 238 with the ends of the threads projecting between the open gripper jaws. During such movement the fingers 225 gripped the threads against plate 221', so that there was no relative movement between the plate 221' and threads. The movement of the threads drew them across the hot plate the same distance they were projected through openings 238. When the forward movement of the frame 221 stopped, the cam 230 raised arm 228 turning shaft 223 against the action of spring 227 to lift fingers 225 from the threads. The grippers 184' then pull the threads across the belts, as already described, frame 37''' is lowered to tighten the threads and knife 104'' cuts them. The fingers 225 are still held above the threads and plate 221' by cam 230, and another half revolution of shaft 231 rotates cranks 235 and returns the frame 221 and connected parts to position of Fig. 14, at which time cam 230 allows spring 227 to turn shaft 223 to clamp the fingers against the threads and plate 221' for repetition of the operation.

Inasmuch as the hot plate frame is pivotally supported at both ends and is connected to frame 221, it moves back and forth with frame 221, but due to the pivotal connection 219, the hot plate frame does not move up and down as does frame 221 due to its rigid connection through plate 221' with frame 37'''.

It will be apparent that the arrangements of Figs. 13-17, provide for relative movement between the advancing mechanism and threads during one movement of the mechanism and prevent such relative movement during reverse movement of the mechanism so that the ends of the threads are always at the ends of openings 238.

In the appended claims I intend the term "label" to cover any sheet or strip such as a wrapper, seal, stamp, as well as labels as generally accepted.

I claim:

1. The method of applying a tearing element such as a flexible strand and a label or the like on a container which comprises assembling the label and strand with the strand on one face of the label with one of its ends projecting beyond an edge of the label, applying adhesive to said face of the label to hold the strand in position on the label and the label on the container, and then while the adhesive is still moist applying the assembled label and strand to the container with the strand next to the container and said end of the strand uncovered and projecting out from said edge of the label.

2. The method of applying a tearing element such as a flexible strand and a label on a container having a flanged cover with the strand around the container adjacent the end of the flange on the cover, which comprises assembling the strand and label with the strand along a definite line on a face of the label and with one end of the strand extending beyond an edge of the label, adhesively maintaining the strand on the label in said position, and then wrapping the label and strand around the container with the strand beneath the label and adjacent the free edge of the cover and said end of the strand projecting from under the label.

3. In apparatus for assembling a label or the like and a tearing element such as a thread, a support, means for saturating the thread with a stiffening liquid, means for drying the saturated thread, and means for advancing the thread through said first two means and depositing predetermined lengths of the thread on the support.

4. In apparatus for assembling a label or the like and a tearing element such as a thread, a support, means for saturating the thread with a stiffening liquid, means for drying the saturated thread, and means for advancing the thread through said first two means and depositing predetermined lengths of the thread on the support in predetermined positions, and means for delivering labels to the support in contact with said strands and in definite relation to said predetermined positions.

5. In apparatus for assembling a plurality of flexible strands and labels or the like, a support, means for advancing said strands as a group across the support a predetermined distance, and means for collectively delivering predetermined lengths of the strands thus advanced to the support in predetermined spaced positions thereon.

6. In apparatus for assembling a plurality of flexible strands and labels or the like, a support, means for advancing said strands as a group across the support a predetermined distance, means for collectively delivering predetermined lengths of the strands thus advanced to the support in predetermined spaced positions thereon, and means for collectively delivering a corresponding number of labels to the support in definite contacting relation to the said strands.

7. In apparatus for assembling labels and tearing strands for application to containers of the flanged cover type, a wrapping support, mechanism for collectively delivering a group of labels to said support in a definite position for application to the containers, and means for delivering a group of strands to said support to engage one face of the labels along lines thereon coinciding substantially with lines around the containers at the end of the cover flanges, and with an end of the strands projecting beyond an edge of the labels.

8. In apparatus for assembling a label and a tearing strand for application to a container as a unit, a support, means for delivering a label to the support in a predetermined position, means for advancing the strand over said support along a line crossing said label position, means for making said strand taut across said position, means for applying adhesive to said face of the label to hold the strand thereon, and means for applying the label and strand to the container.

9. In apparatus for assembling a label and tearing strand for application to a container as a unit, a support at one side thereof, a frame adjacent said support, thread engaging means on said frame for advancing the strand transversely over the support along a predetermined line, a gripper above the support on the other side thereof to hold an end of the strand, means to lower said thread engaging means and gripper to pull the strand taut on the support, and means to sever the strand adjacent said frame.

10. In apparatus for assembling a label and tearing strand for application to a container as a unit, a support, a frame adjacent said support, thread engaging means on said frame for advancing the strand over the support along a predetermined line, a gripper above the support to hold an end of the strand, means to lower said thread engaging means to pull the strand taut on the support, means to sever the strand adjacent said frame, and means to place a label over said strand in predetermined position.

11. In apparatus of the character described, an adhesive applying conveyor, means for placing a strand on said conveyor at a predetermined time and position, and means for delivering a label to the conveyor and over the strand with the strand disposed along a predetermined line along the label and with an end of the strand projecting beyond an edge of the label.

12. In apparatus of the character described, an adhesive applying conveyor, means for placing a group of alined spaced strands on the conveyor at predetermined intervals, and means for depositing a corresponding group of labels on the conveyor with one label over each strand and with an end of each strand projecting beyond an edge of each label.

13. The method of stiffening a flexible strand such as cord and assembling it with a label which comprises continuously advancing the cord through a bath of stiffening liquid and then through a source of heat while feeding the thus stiffened part to a label support.

14. In the method of preparing a label and tearing cord assembly, the step which consists in stiffening the cord while simultaneously projecting it toward a label support.

15. In the method of preparing a label and tearing cord assembly, the steps of first stiffening the cord while advancing it to labelling support and subsequently severing predetermined lengths of the stiffened cord.

16. In apparatus for assembling a label or the like and a tearing element such as a thread, a support, means for stiffening the thread, means for pulling said thread through said stiffening means and advancing said thread toward said support, and mechanism in conjunction with said last means preventing relative movement between said last means and thread during advancing movement thereof and effecting such relative movement during reverse movement of said last means.

17. In apparatus for assembling a label or the like and a tearing element such as a thread, a support, means for stiffening the thread, means for moving said thread through said stiffening means and advancing said thread toward said support a predetermined distance, means for pulling threads across said support, and means for severing threads between the support and said second means.

18. In apparatus for assembling a label and tearing strand and applying the same to a container, a movable conveyor, means for applying an adhesive to one face of the conveyor, means for positioning the tearing strand on the adhesively coated face of the conveyor, means for applying a label over the strand on said adhesively coated face, and means for wrapping the label and strand about the container.

19. In apparatus for assembling labels and tearing strands and applying the same to containers, a movable conveyor, means for applying an adhesive to one face of the conveyor, means for positioning a plurality of strands on said adhesively coated face in predetermined spaced relation to each other, means for applying a plurality of labels to the adhesively coated face of the conveyor with each of the labels over one of the strands in predetermined relation thereto, and means for wrapping the said strands and labels about a plurality of containers.

20. In apparatus for assembling a label and tearing strand and applying the same to a container, a continuous conveyor, a frame on one side of the conveyor, thread engaging means carried by said frame for feeding the thread toward the conveyor, means for advancing the thread across the conveyor, means on the opposite side of the conveyor to grip one end of the conveyed thread, means to lower the frame to draw the thread taut on the conveyor, means adjacent said frame on one side of the conveyor to sever the thread, and means to place a label over said thread on said conveyor for application to the container.

21. In apparatus for assembling a label and tearing strand and applying the same to a container, a continuous conveyor, a frame on one side of the conveyor, means to carry the thread from said frame across the conveyor, means on the opposite side of the conveyor to grip one end of the conveyed thread, means to lower the frame to draw the thread taut on the conveyor, means operable by the lowering movement of the frame to sever the thread, and means to place a label over said thread on said conveyor for application to the container.

JAMES C. THOM.